United States Patent [19]

Tsubaki et al.

[11] 4,223,118
[45] Sep. 16, 1980

[54] PROCESS FOR PRODUCING POLYETHYLENES

[75] Inventors: Kazumi Tsubaki; Hiroshi Morinaga; Takeshi Iwabuchi; Masao Kawahara, all of Ichihara, Japan

[73] Assignee: Nissan Chemical Industries, Limited, Tokyo, Japan

[21] Appl. No.: 941,727

[22] Filed: Sep. 12, 1978

[30] Foreign Application Priority Data

Sep. 22, 1977 [JP] Japan .................................. 52-113279

[51] Int. Cl.² .......................... C08F 4/02; C08F 10/02
[52] U.S. Cl. ................................. 526/128; 252/429 B; 526/125; 526/127; 526/352
[58] Field of Search ................. 526/124, 125, 127, 128

[56] References Cited

U.S. PATENT DOCUMENTS 3,907,759  9/1975  Okada et al. .......................... 526/128

FOREIGN PATENT DOCUMENTS 2365235  7/1974  Fed. Rep. of Germany ............ 526/125
2621591  11/1976  Fed. Rep. of Germany ............ 526/125
1275641  5/1972  United Kingdom ..................... 526/125
1286867  8/1972  United Kingdom ..................... 526/125
1434264  5/1976  United Kingdom ..................... 526/124

OTHER PUBLICATIONS

Kirk-Othmer, Encyclopedia of Chemical Technology, J. Wiley & Sons, Inc., 2nd Ed., vol. 1, (1963), p. 840 same reference vol. 2, p. 53.
Texas Alkyls, Aluminum Alkyls . . . Specification, Properties and Procedures, Technical Brochure of Texas Alkyls, Inc., Feb. 1973, pp. 7 & 10.

Primary Examiner—Edward J. Smith
Attorney, Agent, or Firm—Oblon, Fisher, Spivak, McClelland & Maier

[57] ABSTRACT

A polyethylene is produced by polymerizing ethylene with or without a comonomer in the presence of a catalyst consisting of an organometallic compound and a solid catalytic component (B) obtained by reacting a titanium or vanadium halide with a reaction product (A) in the presence of one or more aluminum alkoxide having the formula $$Al(OR^2)_n X_{3-n}$$

wherein $R^2$ represents a $C_1$–$C_{12}$ alkyl group and X represents a halogen atom and $0 < n \leq 3$, or a reaction product of said aluminum alkoxide and water. The reaction product (A) is obtained by reacting a Grignard reagent with an organosilicon compound selected from the group consisting of hydropolysiloxanes having the structural units of $$R^1_a H_b SiO_{(4-a-b/2)} \qquad (I)$$

wherein $R^1$ represents an alkyl, aryl, aralkyl, alkoxy or aryloxy group; a is 0, 1 or 2; b is 1, 2 or 3; and $a+b \leq 3$, and organosilicon compounds having the formula $$R^3_n Si(OH)_{4-n} \qquad (II)$$

wherein $R^3$ represents a $C_1$–$C_{18}$ hydrocarbon moiety and n is 1, 2 or 3; and polycondensates of the compound (II).

7 Claims, No Drawings

PROCESS FOR PRODUCING POLYETHYLENES

BACKGROUND OF THE INVENTION

The present invention relates to a process for polymerizing ethylene. More particularly, it relates to a process for producing polyethylene having wide molecular weight distribution which has excllent fabricatability such as hollow molding, extrusion molding, which comprises polymerizing ethylene with a novel catalyst having high catalytic activity and long life.

The inventors have studied and found that a catalyst for polymerizing ethylene which has remarkably high catalytic activity and has not disadvantages, can be obtained by using a solid catalytic component obtained by reacting the reaction product (A) with titanium or vanadium halide. (Japanese Patent Publication Nos. 19308/1975, 19309/1975, 154/1976 and 13232/1977.)

It has been found that remarkably high yield of polyethylene per the transition metal halide and remarkably high yield of polyethylene per the solid catalytic component can be attained in the polymerization of ethylene with a catalyst consisting of the solid catalytic component and the organometal compound whereby an adverse effect of the transition metal halide etc. in the polymer is not found even though a complicated and uneconomical step of removing the catalyst is not employed.

This is significant advantages in the practical operation.

In the previously proposed catalytic system, the variation of the catalytic activity during the polymerization is small to maintain high catalytic activity for a long time as the initiation whereby a stable continuous polymerization is attained. The catalyst is highly sensitive to the molecular weight regulator as hydrogen whereby the molecular weight of the polymer can be highly varied by using a small amount of the molecular weight regulator and various grades of the polymers in wide range can be obtained.

The polyethylene obtained by using the previously proposed catalyst system has high bulk density and the powdery form is substantially uniform and spherical whereby the slurry of the polymer and the dried powdery polymer have excellent flowability and the failure in the polymerization such as clogging of the transferring devices is advantageously small.

However, in the previously proposed processes, it is not satisfactorily applied for the production of polyethylene having wide molecular weight distribution.

The narrow molecular weight distribution of polyethylene is preferable in the field of the injection molding etc. whereas it is quite disadvantageous in the fields of the extrusion molding and the hollow molding etc.

When polyethylene having narrow molecular weight distribution is used in the extrusion molding, high extrusion speed can not be obtained to decrease the productivity of the processing machines, and on the other hand, ununiformity of the shape of the molded product and rough surface of shark skin are caused to deteriorate quality of the product.

In the case of the hollow molding, the extrusion speed is also decreased and the shark skin of the surface of the product is caused and strips and pittings are formed to decrease commercial value of the molded product.

The shark skin phenomenon of the surface of the molded product closely related to the molecular weight distribtuion of the polyethylene. The degree of the shark skin is decreased depending upon the increase of the molecular weight distribution.

In General, the flow ratio (FR) is used as a degree of molecular weight distribution and it is a ratio of flowing quantities of a molten polymer under different extruding pressures.

For example, melt indexes are measured at 190° C. under the load of 2.16 Kg and 10.0 Kg by ASTM-D 1238-65T to give $MI_2$ and $MI_{10}$ and FR is given by $MI_{10}/MI_2$.

When $MI_2$ is similar, larger FR indicates wider molecular weight distribution.

In the hollow molding and the extrusion molding, it is preferable to have FR of higher than 14 in order to obtain a molded product having smooth surface.

In some kind of the previously proposed catalysts, it is possible to increase molecular weight distribution in certain degree by selecting kinds and amounts of the organometallic compound or varying conditions for preparing the solid catalytic component and conditions in the polymerization. However, it is not satisfactory.

On the other hand, various efforts for increasing molecular weight distribution have been made by considering the catalyst especially the solid catalytic component. However, in the previously proposed ones, in general, the catalytic activity is low, and the yield of polyethylene per weight of the transition metal halide or weight of the solid catalytic component, is not high enough. Accordingly, even though a carrier is used for improving the catalytic activity, the advantage for eliminating the catalyst separating step can not be satisfactorily eliminated.

SUMMARY OF THE INVENTION

It is an object of the present invention to provide a process for producing polyethylene having high quality and high commercial value in high catalytic activity to obtain it without a catalyst separating step.

It is another object of the present invention to provide a process for producing polyethylene having wide molecular weight distribution to provide excellent extrusion molding characteristic and hollow molding characteristic.

It is the other object of the present invention to provide a process for producing polyethylene without much oily or waxy by-products which are usually formed by using a catalyst system for wide molecular weight distribution.

It is the other object of the present invention to provide a process for producing polyethylene without much deposition of scale on a wall of a reactor.

The foregoing and other objects of the present invention have been attained by polymerizing ethylene with or without a comonomer in the presence of a catalyst consisting of an organometallic compound and a solid catalytic component (B) obtained by reacting a titanium or vanadium halide with a reaction product (A) obtained by reacting a Grignard reagent with an organosilicon compound selected from the group consisting of hydropolysiloxanes having structural units of $$R^1{}_aH_bSiO_{(4-a-b/2)} \qquad (I)$$

wherein $R^1$ represents an alkyl, aryl, aralkyl, alkoxy or aryloxy group; a is 0, 1 or 2; b is 1, 2 or 3; and $a+b \leq 3$, and organosilicon compounds having the formula $$R^3{}_n Si(OH)_{4-n} \qquad (II)$$

wherein $R^3$ represents a $C_1$–$C_{18}$ hydrocarbon moiety, and n is 1, 2 or 3, and polycondensates of the compound (II) in the presence of one or more aluminum alkoxide having the formula $$Al(OR^2)_n X_{3-n} \qquad (III)$$

wherein $R^2$ represents a $C_1$–$C_{12}$ alkyl group and X represents a halogen atom and $0 < n \leq 3$ or a reaction product of said aluminum alkoxide and water.

DETAILED DESCRIPTION OF THE PREFERRED EMBODIMENTS

It is suprising that the molecular weight distribution is significantly wide in comparison with the previously proposed processes.

The reason of the suprising effect is not clear, but it is considered that the solid catalytic component (B) for the wide molecular weight distribution is formed by impregnating the solid component formed by the reaction of the titanium or vanadium halide with the aluminum alkoxide into the solid component formed by the reaction of the reaction product (A) with the titanium or vanadium halide.

The organosilicon compounds used for producing the solid catalytic component (B) include hydropolysiloxanes and organosilicon compounds having an organic group and hydroxy group bonded to silicon atom. The hydropolysiloxanes have the structural units expressed by the following general formula $$R^1{}_a H_b SiO_{(4-a-b/2)} \qquad (I)$$

wherein $R^1$ represents an alkyl, aryl, aralkyl, alkoxy or aryloxy group; a is 0, 1 or 2; b is 1, 2 or 3; and $a+b \leq 3$.

The polymerization degree of hydropolysiloxanes having the formula (I) is not limited and can be in a form of a liquid having low polymerization degree to grease or wax having a viscosity of about 100,000 c.s. at 25° C. and also can be in a form of solid.

The terminal groups of the hydropolysiloxane have not substantial effect for the catalytic activity and accordingly, the terminal groups can be protected by inert groups such as trialkylsilyl group.

Suitable hydropolysiloxanes (I) include tetramethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane, chlorophenylhydropolysiloxane etc.

The organosilicon compounds having an organic group and hydroxy group bonded to silicon atom include silanes having the formula $$R^3{}_n Si(OH)_{4-n} \qquad (II)$$

wherein $R^3$ represents a $C_1$–$C_{18}$ hydrocarbon moiety such as alkyl, cycloalkyl, aralkyl, aryl or alkaryl group which can be straight or branched chain and saturated, unsaturated or cyclic group and n is 1, 2 or 3. When a plurality of $R^3$ are bonded, $R^3$ can be the same or different.

The silanes (II) (n=3) include trimethylhydroxysilane, triethylhydroxysilane, triphenylhydroxysilane, methyldiphenylhydroxysilane, benzyldiphenylhydroxysilane etc.

The silanes (II) (n=2) include diethyldihydroxysilane, dipropyldihydroxysilane, diallyldihydroxysilane, dicyclohexyldihydroxysilane, diphenyldihydroxysilane etc.

The silanes (II) (n=1) include butyltrihydroxysilane, phenyltrihydroxysilane etc.

The organosilicon compounds having organic group and hydroxy group bonded to silicon atom include condensates of the silane having the formula $$R^3{}_n Si(OH)_{4-n}$$

and polysiloxanes having straight or branched chain or net work structure having a bond of Si—O—Si.

Various polysiloxanes are obtained by condensing one or more silanes depending upon the combinations of hydrocarbon moiety $R^3$ and the value of n.

In the present invention, these organosilicon compounds can be used.

The polymerization degree of the polysiloxane is not limited and the polysiloxane can be a liquid having several c.s. in low polymerization degree to grease and wax having about 1,000,000 c.s. at 25° C. and can be also solid.

The number of hydroxy group in the polysiloxane can be one or more per 1 molecule. Thus it is not suitable to have less hydroxy group content and it is preferable to have more than 0.1 wt.% of hydroxy group content.

The polysiloxanes include $\alpha,\omega$-dihydroxydimethylpolysiloxane $HO[Si(CH_3)_2O]_nH$ (n is 2 or more); $\alpha,\omega$-dihydroxymethylphenylpolysiloxane $HO[Si(CH_3)(C_6H_5)O]_n H$ (n is 2 or more).

These organosilicon compounds can be used with or without combining them. It is not always to use pure organosilicon compound.

The Grignard reagents used for producing the reaction product (A) in the present invention are ether-free or ether complexed compounds or mixtures of them having the formula $$(MgR^4{}_2)_p \cdot (R^4 MgX)_q \qquad (IV)$$

wherein $R^4$ represents a hydrocarbon moiety and X represents a halogen atom and p and q are respectively 0 to 1 and $p+q=1$.

The Grignard reagents include $R^4MgX$; $R^4{}_2Mg$ (dihydrocarbyl magnesium); $(MgR^4{}_2)_p \cdot (R^4MgX)_q$ (organic magnesium halide); ether complexes and mixtures thereof.

The Grignard reagents can be easily produced by the conventional methods in the presence of suitable amount of a chelating agent such as ether and amines, in suitable solvent such as ether type solvents e.g. diethyl ether, dibutyl ether, tetrahydrofuran, etc. or hydrocarbon type solvents e.g. heptane, octane, benzene, toluene etc.

The organosilicon compound can be reacted with the Grignard reagent by suitable manners.

In the reaction of the Grignard reagent with hydropolysiloxane, the hydropolysiloxane is added dropwise to the Grignard reagent formed in suitable solvent and the mixture is heated for suitable time after the addition.

The reaction of the Grignard reagent with hydropolysiloxane is performed at room temperature as severe exothermic reaction. However, in order to complete the reaction, it is preferable to heat the reaction mixture at 50° to 100° C. for 1 to 5 hours.

The ratio of Grignard reagent to hydropolysiloxane is preferably in a range of 0.05 to 1:1 as $MgR^4:Si$.

The reaction of the Grignard reagent with the hydroxy group containing organosilicon compound (II) can be attained by the conventional methods as follows.

The Grignard reagent formed in suitable solvent is gradually dissolved into an organosilicon compound (II) under stirring in an inert gas atmosphere. After the addition, the reaction mixture is further stirred to complete the reaction.

The organosilicon compound (II) is preferably used under diluting it with a hydrocarbon solvent, etc. though it is possible to use it without diluting it.

The reaction is usually performed at a reaction temperature of $-50°$ C. to 100° C. and preferably at room temperature or higher.

The reaction time is enough to be 30 minutes to 5 hours.

A ratio of the organosilicon compound (II) to the Grignard reagent can be selected from a range of 1:0.05 to 1 of $OH:MgR^4$ as hydroxy group of the organosilicon compound (II) to the magnesium component.

When the resulting reaction product (A) is used with large amount of an ether used as solvents for the organomagnesium compound, disadvantageous effect is given for the quality of the solid catalytic component (B). Accordingly, it is preferable to remove the volatile component such as ether solvent and then, to dissolve the residue in an inert hydrocarbon solvent or it is also preferable to add an inert hydrocarbon solvent and then to remove only the ether solvent by a distillation.

The aluminum alkoxide having the formula $$Al(OR^2)_nX_{3-n} \quad (III)$$

wherein $R^2$ represents a $C_1$-$C_{12}$ alkyl group and X represents a halogen atom and $0 < n \leq 3$ include aluminum trimethoxide, aluminum triethoxide, aluminum tri-n-propoxide, aluminum tri-isopropoxide, aluminum mono-sec-butoxy diisopropoxide, aluminum tri-n-butoxide, aluminum tri-sec-butoxide, aluminum tri-t-butoxide, aluminum monoethoxydichloride, aluminum diethoxymonochloride, aluminum monoisopropoxydichloride, and aluminum diisopropoxymonochloride.

The aluminum alkoxides can be produced by reacting an organoaluminum compound having the formula $$AlR_n^2Y_{3-n}$$

wherein $R^2$ represents a $C_1$-$C_{12}$ alkyl group and $0 < n \leq 3$ and Y represents a halogen, hydrogen or an alkoxy group with an alcohol.

The aluminum alkoxides can be also produced by reacting $Al(OR^2)_3$ with $AlX_3$ at suitable molar ratio.

The reaction products obtained from the compound (III) with water, can be produced by reacting the compound (III) dissolved or dispersed in an inert hydrocarbon solvent with water.

The water used for the reaction is in a range of 0.1 to 3 mole preferably 0.1 to 2.5 mole per 1 mole of the compound (III). The reaction temperature is in a range of 10° to 200° C. and the reaction time is in a range of 5 minutes to 10 hours.

In the reaction, water can be added without any dilution, however it is preferable to dilute water with a lower alcohol such as methanol, ethanol and isopropanol. The alcohol used for the dilution or the alcohol formed by the reaction is preferably removed by a distillation or it is preferably reacted with an organoaluminum compound having the formula $$AlR_n^2Y_{3-n}$$

to form the aluminum alkoxide having the formula (III), before adding the titanium or vanadium halide.

The compound (III) or the reaction product obtained by reacting the compound (III) with water is preferably used in a range of 0.1 to 10 mole per 1 mole of magnesium in the reaction product (A).

When it is less than 0.1 mole, the effect for increasing molecular weight distribution of polyethylene is not enough whereas when it is more than 10 mole, the catalytic activity is remarkably low, disadvantageously.

The compound (III) or the reaction product obtained by reacting the compound (III) with water can be reacted with the reaction product (A) obtained by reacting the organosilicon compound with the Grignard reagent, in an inert hydrocarbon solvent at $-10°$ to 150° C. for 5 minutes to 10 hours. And then, the product can be reacted with the titanium or vanadium halide.

The compound (III) or the reaction product obtained by reacting the compound (III) with water, can be reacted with the titanium or vanadium halide in an inert hydrocarbon solvent at $-10°$ to 150° C. for 5 minutes to 10 hours. And then, the product can be reacted with the reaction product (A).

The titanium halides used in the process of the present invention can be the compounds having the formula $$TiX_l(OR^5)_{4-l}$$

wherein X represents a halogen atom; $R^5$ represents a $C_1$-$C_8$ hydrocarbon moiety and l is an integer of 1 to 4.

Suitable titanium halides include titanium tetrachloride, titanium tetrabromide, monoethoxy titanium trichloride, mono-n-butoxy titanium trichloride, diethoxy titanium dichloride and diisopropoxy titanium dichloride.

The vanadium halides can be vanadium tetrachloride and vanadium oxytrichloride.

The molar ratio of the titanium or vanadium halide used in the present invention is preferably 1 to 30 times especially 1.5 to 10 times based on the total of the magnesium component in the reaction product (A), the aluminum component in the compound (III) or the reaction product obtained by reacting the compound (III) with water.

When it is less than 1 time, the ratio of the aluminum compound impregnated into the solid catalytic component (B) is remarkably small and the molecular weight distribution can not be increased as desired whereas, when it is more than 30 times, the further additional effect is not found.

The reaction temperature is in a range of $-50°$ to 200° C. In order to improve powdery characteristics of the powdery polyethylene such as bulk density, particle size distribution, the reaction with the titanium or vanadium halide is preferably performed at relatively low temperature of $-50°$ C. to 50° C. at the beginning and the, in order to impregnate effectively the aluminum compound into the solid catalytic component (B), it is preferable to maintain them at higher than 70° C. for 5 minutes to 10 hours.

After the reaction, the solid component obtained by reacting the titanium or vanadium halide is separated and washed with an inert solvent such as hexane, heptane, kerosin to remove free soluble components thereby producing the solid catalytic component (B) for combining with the organometal compound to form a catalyst.

The solid catalytic component (B) can be used in the form of the dispersion in the solvent or it can be also used after drying by evaporating the solvent under a reduced pressure.

The content of the transition metal halide in the solid catalytic component (B) can be selected depending upon the reaction condition such as temperature, time and the use of solvent or non-use.

It is usually preferable to contain 1 to 250 mg of Ti or V per 1 g of the solid catalytic component (B).

In the present invention, the solid catalytic component (B) obtained by the above-mentioned method is combined with the organometallic compound to use as a catalyst for polymerization.

The organometallic compounds can be suitable organometallic compounds used in the conventional Ziegler type catalyst for polymerization.

The organometallic compounds include organoaluminum compounds having the formula $AlR^6_m Y_{3-m}$ wherein $R^6$ represents a $C_1$-$C_8$ alkyl group; Y represents a halogen atom, hydrogen atom or an alkoxy group and $1 \leq m \leq 3$; and organozinc compounds having the formula $Zn_n R_2^7$ wherein $R^7$ represents a $C_1$-$C_8$ alkyl group.

Suitable aluminum compounds include trimethylaluminum, triethylaluminum, tributylaluminum, diethylaluminum chloride, dibutylaluminum chloride, ethylaluminum sesquichloride, diethylaluminum halide, dibutylaluminum halide, diethylaluminum ethoxide etc.

Suitable organozinc compounds include diethylzinc and dibutylzinc etc.

When the organometallic compound is combined with the solid catalytic component (B), the catalyst for polymerizing ethylene can be obtained.

In a reactor, the organometallic compound and the solid catalytic component (B) are separately charged to form the catalyst and then ethylene is fed to polymerize it. It is also possible to react the organometallic compound with the solid catalytic component (B) in an inert solvent to form a dispersion of the catalyst and then, to charge the dispersion in a reactor for the polymerization.

It is also possible to react the solid catalytic component (B) with a small amount of an organoaluminum compound preferably triethylaluminum; or an organoaluminum chloride e.g. diethylaluminum monochloride, ethylaluminum sesquichloride, ethylaluminum dichloride, or an organoaluminum alkoxide e.g. diethylaluminum isopropoxide, and then, to feed the reaction product with suitable amount of an organometallic compound into the polymerization system for polymerizing ethylene.

The conditions for polymerizing ethylene with the catalyst of the present invention is substantially the same with the conditions for the conventional polymerization with Zieglar catalysts.

For example, the catalyst is dispersed in an inert hydrocarbon solvent such as hexane, heptane, and kerosine and ethylene is fed to polymerize it.

The reaction temperature is preferably in a range of 30 to 200° C. especially 60° to 100° C. and the polymerization is performed under the atmospheric pressure to 50 Kg/cm².

The catalyst is usually used in a range of 0.1 to 50 mmole, especially 0.3 to 10 mmole of the organometallic compound per 1 liter of the solvent and also in a range of 2 to 100 mg, especially 5 to 50 mg of the solid catalytic component (B) per 1 liter of the solvent.

When the catalyst is used for polymerizing ethylene, the molecular weight of the resulting polymer can be varied depending upon the polymerization temperature and the amount of the catalyst. However, it is mostly effective to add hydrogen in the polymerization system in order to control the molecular weight.

The catalyst of the present invention is useful for polymerizing ethylene or copolymerizing ethylene with less than 10% of the other α-olefin such as propylene, butene-1, and hexene-1.

The catalyst of the present invention has high catalytic activity whereby an amount of the catalyst remained in the resulting polymer is significantly small and the effect of the remained catalyst is negligible and the resulting polymer can be fabricated without removing the remained catalyst from the polymer so as to obtain a molded product having excellent hue and strength, advantageously.

The molecular weight distribution of the resulting polyethylene is wide whereby excellent characteristics in the extrusion molding and the hollow molding can be attained.

The present invention will be further illustrated by certain examples.

EXAMPLE 1

(a) Preparation of Reaction product (A) obtained from hydropolysiloxane and Grignard reagent In a glass flask which was dried and purged with nitrogen gas, 75 ml of solution of n-butylmagnesium chloride in tetrahydrofuran (0.167 mole of n-butylmagnesium chloride) was charged and then 10.5 ml of methyl hydropolysiloxane having terminal trimethyl silyl group (viscosity about 30 c.s. at 25° C.) (0.175 mole as Si) was added dropwise under stirring it.

The reactor was cooled with a coolant because of the exothermic reaction. After the addition, the reaction mixture was kept at 70° C. for 1 hour and it was cooled to the room temperature to obtain a dark brown transparent solution.

A part of the solution was sampled and the unreacted n-butyl magnesium chloride was measured by the Gilman's method (J. Am Chem. Soc. 47 2002 (1925). As the result, no unreacted n-butylmagnesium chloride was found. The solution was kept at 50° C. and the solvent was distilled off under a reduced pressure and the residue was dissolved in toluene to give 83.5 ml of the solution.

(b) Preparation of Solid catalytic component (B)

In a glass flask dried and purged with nitrogen gas, 16.3 g of aluminum triisopropoxide was charged and it was dissolved in 133 ml of toluene and 40 ml of a solution of the reaction product (A) in toluene (0.08 mole as magnesium) was added dropwise to the solution at 0° C.

After stirring the solution for 30 minues, 35.2 ml of titanium tetrachloride was added dropwise to it at 0° C. After the addition, the mixture was heated at 100° C. to react them for 3 hours.

After the reaction, the solid component was separated and washed with 1 liter of n-hexane by decantations for 4 times and then, it was dried at 50° C. under a reduced pressure to obtain 35.7 g of the grayish green solid catalytic component (B).

The solid catalytic component (B) corresponded to 446 g per 1 mole of magnesium based on the magnesium component in the reaction product (A).

The titanium content in 1 g of the solid catalytic component (B) was 162 mg.

(c) Polymerization

In a 1.2 liter autoclave equipped with a jacket for heating and cooling and a stirrer which was dried and purged with nitrogen gas, 600 ml of purified n-hexane was charged and heated at 60° C. and then, 0.5 mmole of triisobutyl aluminum and 10 mg of the solid catalytic component (B) obtained in the step (b) were sequentially added. Then, 3 Kg/cm$^2$ of hydrogen gas was fed and the autoclave was heated to 80° C. and then, ethylene was continuously fed to maintain the total pressure of 9 Kg/cm$^2$ to perform the polymerization for 1 hour. After cooling the autoclave, the polymer was separated by a glass filter and it was dried at 60° C. for 5 hours under a reduced pressure to obtain 101 g of a white powdery polyethylene having a bulk density of 0.297 g/cc.

The resulting polyethylene had MI$_2$ of 0.33 g/10 min and FR of 14.6. The catalytic ativity was 62.3 Kg PE/g Ti.hr or 10.1 Kg PE/g cat.hr.

Reference 1

(b) Preparation of Solid catalytic component

In accordance with the process of Example 1-(b) except excluding aluminum triisopropoxide, the solid catalytic component was prepared to obtain 17.2 g of grayish solid catalytic component.

The solid catalytic component corresponded to 215 g per 1 mole of magnesium component in the reaction product (A).

The titanium content in 1 g of the solid catalytic component was 95 mg.

(c) Polymerization

In accordance with the process of Example 1-(c) except using 4 mg of the solid catalytic component and feeding 2 Kg/cm$^2$ of hydrogen, the polymerization was performed to obtain 150 g of white powdery polyethylene. The resulting polyethylene had MI$_2$ of 0.37 g/10 min and FR of 9.5 wherein the molecular weight distribution was remarkably narrow.

Reference 2

(b) Preparation of Solid catalytic component

In accordance with the process of Example 1-(b) except excluding the reaction product (A), the solid catalytic component was prepared to obtain 21 g of pale yellow solid component.

The titanium content in 1 g of the solid catalytic component was 199 mg.

(c) Polymerization

In accordance with the process of Example 1-(c) except using 20 mg of the solid catalytic component obtained in the step (b), the polymerization was performed to obtain quite small amount of polyethylene.

EXAMPLE 2

(b) Reaction of Solid catalytic component (B) and organoaluminum compound

A mixture of 1 g of the solid catalytic component (B) obtained by Example 1-(b) and 100 ml of n-hexane was mixed to form a slurry and 5 mmole of diethylaluminum monochloride was added and the mixture was stirred at room temperature for 1 hour.

(c) Polymerization

In accordance with the process of Example 1-(c) except using the catalyst for 8 mg of the solid catalytic component (B) and feeding 3.5 Kg/cm$^2$ of hydrogen gas, the polymerization was performed to obtain 74.5 g of white powdery polyethylene having a bulk density of 0.333 g/cc.

The resulting polyethylene had MI$_2$ of 0.31 g/10 min and FR of 15.4. The catalytic activity was 57.4 Kg PE/g Ti.hr and 9.3 Kg PE/g cat.hr.

EXAMPLE 3

(b) Preparation of Solid catalytic component (B)

In a glass flask which was dried and purged with nitrogen gas, 10.9 g of aluminum diisopropoxy monochloride was charged and was dissolved in 100 ml of toluene and then, 25 ml of the toluene solution of the reaction product (A) obtained in Example 1-(a) (0.05 mole as magnesium component) was added and the mixture was stirred at room temperature for 30 minutes. Then, 25 ml of titanium tetrachloride was added to the mixture and the reaction was performed at 100° C. for 2 hours. After the reaction, the solid component was separated and washed with 1 liter of n-hexane by decantations for 4 times, and then, it was dried at 50° C. under a reduced pressure to obtain 23.8 g of gray solid catalytic component (B).

The titanium content in 1 g of the solid catalytic component (B) was 97.3 mg.

(c) Polymerization

In accordance with the process of Example 1-(c) except using 8 mg of the solid catalytic component (B) and feeding 2.5 Kg/cm$^2$ of hydrogen gas, the polymerization was performed to obtain 114.4 g of powdery polyethylene having a bulk density of 0.275 g/cc.

The resulting polyethylene had MI$_2$ of 0.35 g/10 min and FR of 14.2.

The catalytic activity was 147 Kg PE/g Ti.hr and 14.3 Kg PE/g cat.hr.

EXAMPLE 4

(b) Preparation of Solid catalytic component (B)

In a glass flask dried and purged with nitrogen gas, 7.5 g of aluminum triisopropoxide was sampled and dissolved in 100 ml of toluene. Then, a mixture of 10 ml of isopropyl alcohol and 1.3 ml of water was added at 60° to 65° C. and then, the mixture was refluxed for 2 hours and 35 ml of a mixture of isopropyl alcohol and toluene was distilled off by a distillation under the atmospheric pressure to obtain a viscous solution having slight turbidity. To the solution, 19 ml of the toluene solution of the reaction product (A) obtained in the process of Example 1-(a) (0.038 mole as magnesium) was added and the mixture was stirred at room temperature for 30 minutes and then 25 ml of titanium tetrachloride was added and the reaction was performed at 100° C. for 2 hours. After the reaction, the solid component was washed with 400 ml of n-hexane by decantations for 4 times to obtain a slurry of the solid catalytic component (B) in n-hexane.

The titanium content in 1 g of the solid catalytic component (B) was 147 mg.

(c) Polymerization

In accordance with the process of Example 1-(c) except using 20 mg of the solid catalytic component (B), the polymerization was performed to obtain 100 g of powdery polyethylene. The polyethylene had $MI_2$ of 0.45 g/10 min and FR of 14.5.

EXAMPLE 5

(b) Preparation of Solid catalytic component (B)

In a glass flask dried and purged with nitrogen gas, 8.2 g of aluminum triisopropoxide was charged and it was dissolved in 50 ml of toluene and then a mixture of 5 ml of isopropyl alcohol and 1.1 ml of water was added dropwise at room temperature and then, the reaction was performed at 80° C. for 1.5 hours to obtain a viscous solution having turbidity. To the solution, 20 ml of the toluene solution of the reaction product (A) obtained by the process of Example 1-(a) was added and the reaction was performed at 90° C. for 1 hour to obtain a white slurry. Toluene was added to give 200 ml of the solution and then, 0.1 mole of diethyl aluminum monochloride was added dropwise at room temperature and the reaction was performed at 90° C. for 30 minutes. Then, 35 ml of titanium tetrachloride was added dropwise at room temperature and the reaction was performed at 95° C. for 1 hour. After the reaction, a part of the solid component was sampled and washed with n-hexane by decantations for 4 times to obtain a n-hexane slurry of the solid catalytic component (B).

The titanium content in 1 g of the solid catalytic component (B) was 163 mg.

(c) Polymerization

In accordance with the process of Example 1-(c) except using 20 mg of the solid catalytic component (B), the polymerization was performed to obtain 81.7 g of powdery polyethylene.

The resulting polyethylene had $MI_2$ of 0.33 g/10 min and FR of 16.0.

EXAMPLE 6

(b) Preparation of Solid catalytic component (B)

In accordance with the process of Example 1-(b) except using 19.7 g of aluminum triisobutoxide instead of aluminum triisopropoxide, the solid catalytic component was prepared to obtain 39.3 g of brown solid catalytic component (B). The solid catalytic component (B) corresponded to 491 g per 1 mole of magnesium in the reaction product (A).

The titanium content in 1 g of the solid catalytic component (B) was 163 mg.

A slurry of 1 g of the solid catalytic component (B) in 100 ml of n-hexane was prepared and 3.4 mmole of diethyl aluminum monochloride was added to the slurry and the mixture was stirred at room temperature for 1 hour.

(c) Polymerization

In accordance with the process of Example 1-(c) except using 8 mg of the solid catalytic component (B) treated with the organoaluminum compound and feeding 2.0 Kg/cm² of hydrogen gas, the polymerization was performed to obtain 61 g of powdery polyethylene. The resulting polyethylene had $MI_2$ of 0.10 g/10 min and FR of 14.7.

EXAMPLE 7

(b) Preparation of Solid catalytic component (B)

In a glass flask dried and purged with nitrogen gas, 110 ml of toluene and 40 ml of the toluene solution of the reaction product (A) obtained by the process of Example 1-(a) were charged and cooled to 0° C. Then, in the other glass flask, 40 ml of toluene was charged and 32.6 g of aluminum triisopropoxide and 17.6 ml of titanium tetrachloride were added and the reaction was performed at 100° C. for 1 hour. The reaction mixture was added dropwise to the toluene solution of the reaction product (A) at 0° C. Then, 35 ml of titanium tetrachloride was added dropwise to the mixture. After the addition, the reaction was further performed at 110° C. for 2 hours. After the reaction, the solid component was separated and washed with 1 liter of n-hexane by decantations for 4 times and then, it was dried at 50° C. under a reduced pressure to obtain 48.2 g of dark green solid catalytic component (B).

The titanium content in 1 g of the solid catalytic component (B) was 174 mg. A slurry of 1 g of the solid catalytic component (B) and 100 ml of n-hexane was prepared and 3.6 mmole of diethyl aluminum monochloride was added and the mixture was stirred at room temperature for 1 hour.

(c) Polymerization

In accordance with the process of Example 1-(c) except using 8 mg of the solid catalytic component (B) treated with the organoaluminum compound, heating to 85° C. in the polymerization, the polymerization was performed to obtain 56 g of powdery polyethylene.

The resulting polyethylene had $MI_2$ of 0.11 g/10 min and FR of 16.8.

EXAMPLE 8

(b) Preparation of Solid catalytic component (B)

In accordance with the process of Example 1-(b) except using 32.7 g of aluminum triisopropoxide and adding dropwise 50 ml of titanium tetrachloride at room temperature, the solid catalytic component was prepared to obtain 52.8 g of gray solid catalytic component (B).

The solid catalytic component (B) corresponded to 660 g per 1 mole of magnesium component in the reaction product (A).

The titanium content in 1 g of the solid catalytic component (B) was 176 mg.

A slurry of 1 g of the solid catalytic component (B) in n-hexane was prepared and 3.6 mmole of triethyl aluminum was added and the mixture was stirred at room temperature for 1 hour.

(c) Polymerization

In accordance with the process of Example 1-(c) except using 20 mg of the solid catalytic component (B) and feeding 4.0 Kg/cm² of hydrogen gas, the polymerization was performed to obtain 75.0 g of white powdery polyethylene.

The resulting polyethylene had $MI_2$ of 0.20 g/10 min and FR of 16.5.

EXAMPLE 9

(a) Preparation of Reaction Product (A) obtained from dihydroxydimethyl polysiloxane and Grignard reagent In a glass flask dried and purged with nitrogen gas, 54 ml of α,ω-dihydroxydimethyl polysiloxane having an average degree of polymerization of 9 (SiOH content:

0.146 mol) and 100 ml of toluene were charged and 50 ml of a diethyl ether solution of n-butyl magnesium chloride (0.146 mole as n-butyl magnesium chloride) was added dropwise under stirring it. The reactor was cooled with a coolant because of the exothermic reaction. After the addition, the reactor was kept at 70° C. for 1 hour to obtain a solution having slight turbidity.

A part of the solution was sampled and the unreacted n-butylmagnesium chloride was measured by the Gilman's method. As the result, the unreacted n-butyl-magnesium chloride was not found.

Then, 50 ml of the solution (36 mmole as magnesium) was sampled and diluted with 100 ml of toluene, and then, it was heated at 80° C. to remove excess diethyl ether by distilling off to be about ⅓. The resulting viscous solution was diluted with 100 ml of toluene.

(b) Preparation of Solid catalytic component (B)

After dissolving 7.3 g of aluminum triisopropoxide into the toluene solution of the resulting reaction product (A), 30 ml of titanium tetrachloride was added dropwise at room temperature.

After the addition, the reaction was performed at 110° C. for 3 hours and the solid component was separated and washed with 500 ml of n-hexane by decantations for four times and dried at 50° C. under a reduced pressure to obtain 16.6 g of pale yellow solid catalytic component (B).

The titanium content in 1 g of the solid catalytic component (B) was 135 mg.

(c) Polymerization

In accordance with the process of Example 1-(c) except using 20 mg of the solid catalytic component (B) and charging 2 g of butene-1 at the beginning, the polymerization was performed to obtain 92 g of powdery polyethylene having a bulk density of 0.296 g/cc. The resulting polyethylene had $MI_2$ of 0.27 g/10 min and FR of 16.3.

EXAMPLE 10

Preparation of Solid catalytic component (B)

In accordance with the process of Example 1-(b) except using 20.0 g of aluminum tri-sec-butoxide instead of aluminum triisopropoxide, a reddish brown solid catalytic component (B) was prepared.

The titanium content in 1 g of the solid catalytic component (B) was 150 mg.

In accordance with the process of Example 6-(b), 1 g of the solid catalytic component (B) was treated with diethylaluminum monochloride.

(c) Polymerization

In accordance with the process of Example 6-(c), except using the treated solid catalytic component, the polymerization was performed to obtain 130 g of powdery polyethylene. The polyethylene had $MI_2$ of 0.24 g/10 min and FR of 14.0.

EXAMPLE 11

Preparation of Reaction product (A) obtained from diphenyldihydroxysilane and Grignard reagent In accordance with the process of Example 9-(a), except using diphenyldihydroxysilane (SiOH content: 0.146 mol), a toluene solution of the reaction product (A) was prepared.

(b) Preparation of Solid catalyst component (B)

After dissolving 10.2 g of aluminum triisopropoxide was added to the toluene solution of the reaction product (Mg: 0.05 mol), 30 ml of vanadium oxytrichloride was added dropwise to the solution at room temperature. After the addition, the reaction was performed at 70° C. for 2 hours and the solid component was separated and washed with n-hexane for 4 times by a decantation.

The vanadium content in 1 g of the solid component (B) was 188 mg.

(c) Polymerization

In accordance with the process of Example 1-(c) except using 40 mg of the solid catalytic component (B) and feeding 2.0 Kg/cm² of hydrogen, the polymerization was performed to obtain 46 g of powdery polyethylene having a bulk density of 0.335 g/cc. The polyethylene had $MI_2$ of 0.30 g/10 min and FR of 18.9.

What is claimed is:

1. A process for producing polyethylene which comprises polymerizing ethylene with or without a comonomer in the presence of a catalyst consisting of an organometallic compound and a solid catalytic component (B) obtained by reacting a titanium or vanadium halide with a reaction product (A) obtained by reacting a Grignard reagent with an organosilicon compound selected from the group consisting of hydropolysiloxanes having structural units of $$R^1{}_aH_bSiO_{(4-a-b/2)} \qquad (I)$$

wherein $R^1$ represents an alkyl, aryl, aralkyl, alkoxy or aryloxy group; a is 0, 1 or 2; b is 1, 2 or 3; and $a+b \leq 3$ and organosilicon compounds having the formula $$R^3{}_nSi(OH)_{4-n} \qquad (II)$$

wherein $R^3$ represents a $C_1$-$C_{18}$ hydrocarbon moiety and n is 1, 2 or 3, and polycondensates of the compound (II) in the presence of one or more aluminum alkoxide having the formula $$Al(OR^2)_nX_{3-n} \qquad (III)$$

wherein $R^2$ represents a $C_1$-$C_{12}$ alkyl group and X represents a halogen atom and $0 < n \leq 3$.

2. The process of claim 1 wherein the reaction product A is obtained by reacting the Grignard reagent having the formula $$(MgR^4{}_2)_p \cdot (R^4MgX)_q \qquad (IV)$$

wherein $R^4$ represents a hydrocarbon moiety and X represents a halogen atom and p and q are respectively 0 to 1 and $p+q=1$ with an organosilicon compound of hydropolysiloxane having the structural unit expressed by the following formula $$R_a{}^1H_bSiO_{(4-a-b/2)}$$

or an organosilicon compound having the formula $$R^3{}_nSi(OH)_{4-n}$$

or a condensation product thereof.

3. The process of claim 1 wherein the aluminum alkoxide (III) is mixed with the reaction product (A) or the titanium or vanadium halide in an inert solvent.

4. The process claim 1 wherein the aluminum alkoxide is a reaction product of an organoaluminum compound having $$AlR^2{}_nY_{3-n}$$

with an alcohol or a reaction product of $Al(OR^2)_3$ with $AlX_3$.

5. The process of claim 1 wherein a ratio of the Grignard reagent to the organosilicon (I) or (II) is in a range of 0.05 to 1:1 as $MgR^4$:Si.

6. The process of claim 1 wherein a molar ratio of titanium and/or vanadium halide the magnesium component in the reaction product (A) and the aluminum component in the aluminum alkoxide (III) and/is 1 to 30:1.

7. The process of claim 1 wherein the organometal compound is an organoaluminum compound having the formula $$AlR^6{}_mY_{3-m}$$

wherein $R^6$ represents a $C_1$–$C_8$ alkyl group; Y represents a halogen atom, hydrogen atom or an alkoxy group and $1 < m \leqq 3$ or an organozinc compound having the formula $$Z_nR_2{}^7$$

wherein $R^7$ represents a $C_1$–$C_8$ alkyl group.

* * * * *